United States Patent [19]

Modlinski et al.

[11] Patent Number: 4,922,108
[45] Date of Patent: May 1, 1990

[54] INFRARED RADIATION SOURCE, ESPECIALLY FOR A MULTI-CHANNEL GAS ANALYZER

[75] Inventors: Ulrich Modlinski, Alzenau-Albstadt; Gerhard Wiegleb, Geiselbach, both of Fed. Rep. of Germany

[73] Assignee: Leybold Aktiengesellschaft, Hanau, Fed. Rep. of Germany

[21] Appl. No.: 189,654

[22] Filed: May 3, 1988

[30] Foreign Application Priority Data

Mar. 18, 1988 [DE] Fed. Rep. of Germany ....... 3809160

[51] Int. Cl.$^5$ .................. G01N 21/59; F21V 31/00
[52] U.S. Cl. .................. 250/504 R; 250/343; 250/495.1
[58] Field of Search ........... 250/504 R, 495.1, 496.1, 250/522.1, 343; 313/568, 569, 572, 573

[56] References Cited

U.S. PATENT DOCUMENTS

| | | | |
|---|---|---|---|
| 3,394,257 | 7/1968 | Moldenhauer | 250/343 |
| 3,445,662 | 5/1969 | Langley | 250/504 |
| 3,694,624 | 9/1972 | Buchta | 250/495.1 |
| 3,715,153 | 2/1973 | Schunck et al. | 250/343 |
| 3,920,993 | 11/1975 | Cederstrand et al. | 250/343 |
| 4,064,402 | 12/1977 | Posnansky | 250/495.1 |
| 4,188,542 | 2/1980 | Hogg et al. | 250/504 |
| 4,320,297 | 3/1982 | Cederstrand et al. | 250/343 |
| 4,426,570 | 1/1984 | Hikino et al. | 250/504 R |
| 4,496,840 | 1/1985 | Fabinski et al. | 250/343 |
| 4,547,704 | 10/1985 | Brinn et al. | 313/579 |
| 4,618,771 | 10/1986 | Farren | 250/343 |
| 4,714,832 | 12/1987 | Fabinski | 250/343 |
| 4,818,875 | 4/1989 | Weiner | 250/343 |

FOREIGN PATENT DOCUMENTS 1237465 3/1967 Fed. Rep. of Germany ...... 250/504
3638787 12/1986 Fed. Rep. of Germany.

OTHER PUBLICATIONS

Turnbull, "Non-Dispersive Infra-red Gas Analyzers" *Electronics and Instrumentation*, vol. 2 (No. 12) Mar., 1972 pp. 11–15.

*Primary Examiner*—Constantine Hannaher
*Attorney, Agent, or Firm*—Felfe & Lynch

[57] ABSTRACT

In an infrared radiation source, especially for a multi-channel gas analyzer, a radiant body (3) is provided with a reflector (4) disposed behind it, and a window (5) of calcium-fluoride at least partially covering the radiant body (3) is provided, the radiant body (3) being partially surrounded at its rear by a cup-like case (6) whose circumferential margin is hermetically joined to the window (5) by an intermediate ring (19). The interior (7) of the radiant source can be pumped empty of air through a passage (8) in a tube connection (9) formed by the case (6) or provided with an oxidizing atmosphere, thereby achieving a high insensitivity to the position of the infrared radiation source.

4 Claims, 1 Drawing Sheet

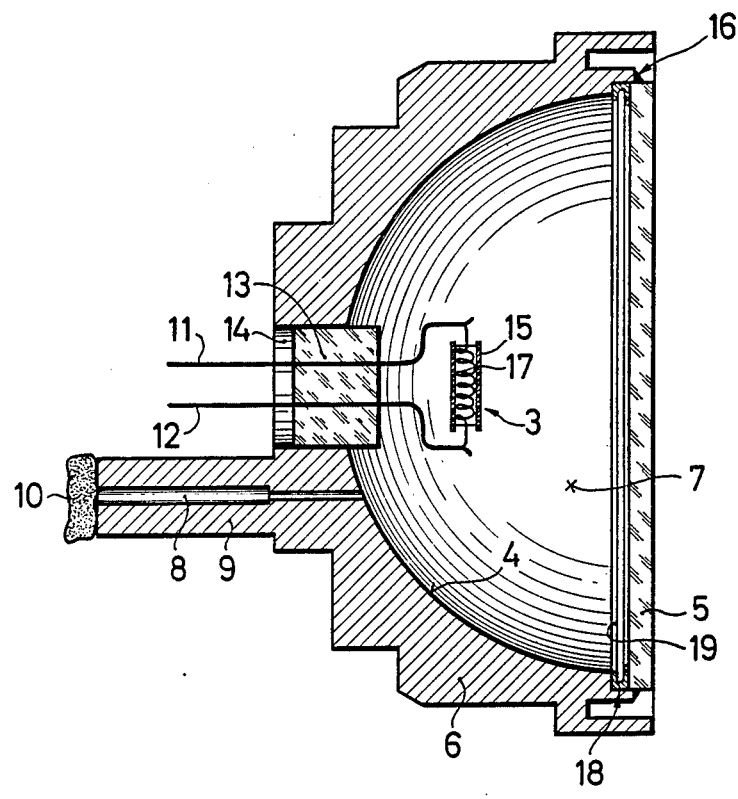

INFRARED RADIATION SOURCE, ESPECIALLY FOR A MULTI-CHANNEL GAS ANALYZER

The invention relates to an infrared radiation source, especially for a multi-channel gas analyzer, having a radiant body, a reflector disposed in back of the radiant body, and a window of material permeable to radiation at least partially covering the radiant body.

A multi-channel gas analyzer with two gas cells and infrared radiation sources is known, in which a chopper disk is disposed between the gas cells and the radiation sources (DE Patent application No. P 36 38 787.8). During the measuring process the infrared radiation passes through the chopper disk and is then carried through filter masks to interference filters and reference filters, and from there through the infrared detectors which in turn are connected by preamplifiers to a microprocessor circuit. It has been found that known apparatus of this kind have a decided sensitivity to their position.

The sensitivity of these infrared gas photometers depends primarily on the properties of the infrared radiation sources used. The term, "position sensitivity" is to be understood in this connection as the variation of the null signal of the apparatus at different angular positions of the physical photometer structure with respect to the horizontal. Studies have shown that this position sensitivity is due to thermal convection in the radiator casing. The radiant emission is disturbed by this convection to the extent that an undesired signal change is to be observed.

It is the object of the present invention to create an infrared radiation source which will operate largely independently of position, which will have a long life, and which will be easy and inexpensive to manufacture.

This object is achieved according to the invention by a casing partially surrounding the radiation source from the rear, which is hermetically sealed by the window, and has a sealable passage leading into the chamber containing the radiation body, through which the chamber can be evacuated and/or filled with a gas.

Preferably, the casing affixed to the window forms the reflector and at the same time has a passage which on the one hand leads into the space between the window and the reflector, and on the other hand forms with the casing a pipe connection, while its end remote from the chamber can be closed with a stopper or by welding, cementing or pinching. Advantageously the radiant body is an incandescent coil whose ends are connected to electrical conductors which in turn are brought sealingly through a plug which is inserted into an opening in the case and is hermetically sealed. To limit the radiant spectrum, the radiant body in the form of a coil is at least partially surrounded by a sleeve-like ceramic body.

The window is best made from a material permeable to the infrared radiation, such as calcium-fluoride, and is bonded at its circumferential margin to the casing consisting of a metal material, or by a glass weld through an intermediate ring.

According to the invention, in the space between the window and the reflector an oxidizing atmosphere in the range of 100 to 200 mbar absolute pressure is produced, of for example approximately 160 mbar $N_2 + 40$ mbar $O_2$ partial pressure, in order to achieve a maximum of position insensitivity with a maximum life expectancy of the radiant source.

BRIEF DESCRIPTION OF THE DRAWING

The invention admits of a great variety of embodiments; one of them is represented diagrammatically in the appended drawing showing a longitudinal cross section of an infrared radiation source.

DETAILED DESCRIPTION OF THE INVENTION

The infrared radiation source which is represented in the drawing includes a cup-like case made of a metallic material whose calotte-like inside surface forms the radiation reflector 4 and has an appropriately polished surface. The case 6 also has a tube connection 9 which is disposed off-center on the side of the case 6 facing away from the reflector 4, and has a passage 8 which leads at one end to the reflector 4 and at the other is flame-sealed. In the center of the cup-shaped reflector 4 there is provided an opening 14 into which a plug 13 of glass or ceramic is inserted, which has the two electric wires or conductors 11 and 12 whose ends inside the case are joined by a radiant body 3 in the form of an incandescent coil 17. The incandescent coil 17 is surrounded by a sleeve-like ceramic body 15 which acts as a radiation filter. The case has a circumferential groove 18 bounding the reflector 4, into which the intermediate ring 19 is inserted, which is made, for example, of silver and is bonded to the window 5 by a glass solder, for example, which seals the chamber 7 containing the radiant body 3. The window 5 is made from calcium-fluorite and is held at its circumferential margin by the intermediate ring 19 at the groove 18.

To improve the position-independence of the infrared radiation source, the chamber 7 is pumped down through the tube connection 9 to a pressure of less than 400 mbar, after first the plug 13 has been inserted hermetically into the opening 14 and the window 5 has been welded to the case 6. The radiant emission of the radiant body 3 is produced by the filament or incandescent coil 17 which consists of a nickel-chrome alloy, an oxidizing atmosphere ($O_2$) being necessary for a long life of the radiant body 3. In the range of 100–200 mbar absolute pressure, at, for example, approximately 160 $N_2 + 40$ mbar $O_2$ partial pressure, the requirement of a long life at high radiant emission and good position-independence can be fulfilled.

We claim:

1. Infrared radiation source for a multi-channel gas analyzer, comprising: a radiant body; a reflector disposed in back of the radiant body; a window of material permeable to radiation at least partially disposed in front of the radiant body; and a case partially surrounding the radiant body on its rear; said case being hermetically sealed by the window, and forming the reflector; said case further having a sealable passage, which at one end leads into a chamber containing the radiant body; said radiant body being located between the window and the reflector, and the other end of said sealable passage forming with the case a tube connection, and whose end remote from the chamber is closed, through which passage the chamber is filled with gas before being closed, the gas comprising in the range of 100–200 mbar absolute pressure of an oxidizing atmosphere.

2. Infrared radiation source according to claim 1, in which the radiant body is in the form of an incandescent coil whose ends are joined to electrical conductors which exit the case through an opening in the case, and a plug which hermetically seals the opening in the case.

3. Infrared radiation source according to claim 1, in which the radiant body is formed as a coil and is surrounded, at least partially, by a sleeve-like ceramic body.

4. Infrared radiation source according to claim 1, in which the case is formed from a metal material and the window is formed from a material permeable to infrared radiation, and at its circumferential margin is joined to the case by a glass solder or by a metal intermediate ring.

* * * * *

UNITED STATES PATENT AND TRADEMARK OFFICE
CERTIFICATE OF CORRECTION

PATENT NO. : 4,922,108

DATED : May 1, 1990

INVENTOR(S) : Ulrich Modlinski, et al.

It is certified that error appears in the above-identified patent and that said Letters Patent is hereby corrected as shown below:

Column 1, line 58 for "fluoride" read

-- fluorite --.

Signed and Sealed this

Twenty-fifth Day of August, 1992

Attest:

DOUGLAS B. COMER

*Attesting Officer*     *Acting Commissioner of Patents and Trademarks*